(12) United States Patent
Yu (10) Patent No.: US 10,676,924 B2
(45) Date of Patent: Jun. 9, 2020

(54) STRUCTURE FOR BLOCKING HEAT TRANSFER THROUGH THERMAL BRIDGE OF CURTAIN WALL BUILDING

(71) Applicant: Weiping Yu, Beijing (CN)

(72) Inventor: Weiping Yu, Beijing (CN)

( * ) Notice: Subject to any disclaimer, the term of this patent is extended or adjusted under 35 U.S.C. 154(b) by 10 days.

(21) Appl. No.: 15/324,758

(22) PCT Filed: Nov. 24, 2015

(86) PCT No.: PCT/CN2015/095388
§ 371 (c)(1),
(2) Date: Jan. 9, 2017

(87) PCT Pub. No.: WO2017/088107
PCT Pub. Date: Jun. 1, 2017

(65) Prior Publication Data
US 2017/0298620 A1 Oct. 19, 2017

(51) Int. Cl.
*E04B 2/88* (2006.01)
*E04B 2/96* (2006.01)
*E04B 1/78* (2006.01)
*E06B 3/263* (2006.01)

(52) U.S. Cl.
CPC .................. *E04B 2/88* (2013.01); *E04B 1/78* (2013.01); *E04B 2/967* (2013.01); *E06B 3/26301* (2013.01)

(58) Field of Classification Search
CPC . E04B 2/88; E04B 2/967; E04B 2/885; E04B 2/90; E04B 2/96; E04B 1/78; E06B 3/26301; E06B 3/221; E06B 3/5409; E06B 3/5427; E06B 3/56
See application file for complete search history.

(56) References Cited

U.S. PATENT DOCUMENTS

| | | | | |
|---|---|---|---|---|
| 3,734,550 A * | 5/1973 | Vance | ..................... | E04B 2/965 403/34 |
| 3,968,608 A * | 7/1976 | Swango | .................... | E04B 2/96 52/235 |
| 4,650,702 A * | 3/1987 | Whitmyer | ............. | E06B 3/5427 428/31 |
| 5,381,637 A * | 1/1995 | Farag | .................... | E06B 3/5427 52/204.593 |

(Continued)

FOREIGN PATENT DOCUMENTS

| AU | 2015394926 | | 6/2017 |
|---|---|---|---|
| CN | 202706291 U | * | 1/2013 |

(Continued)

*Primary Examiner* — Ryan D Kwiecinski
*Assistant Examiner* — Matthew J Gitlin (57) ABSTRACT

Disclosed in the present invention is a structure for blocking heat transfer through a thermal bridge of a curtain wall building, including a curtain wall, an indoor metal frame, an outdoor metal frame and/or metal components, wherein: an integral thermal break strip, which is installed close to an outside and made of an aerogel thermal insulation blanket, is fixed between the indoor metal frame and the curtain wall and/or the outdoor metal frame and/or the metal components. The present invention has simple structure, convenient construction technology, great structural strength, excellent fireproof performance; low comprehensive construction cost and substantially improved energy-saving effect of the curtain wall.

1 Claim, 7 Drawing Sheets

(56) References Cited

U.S. PATENT DOCUMENTS

| | | | | |
|---|---|---|---|---|
| 5,452,552 A * | 9/1995 | Ting | ............... | E04B 2/967 52/235 |
| 5,687,524 A * | 11/1997 | Ting | ............... | E04B 2/965 52/235 |
| 7,779,584 B2 * | 8/2010 | Arias | ............... | E04B 2/965 52/204.591 |
| 8,402,714 B2 * | 3/2013 | Labrecque | ............... | E04B 2/965 52/745.09 |
| 9,340,973 B2 * | 5/2016 | Carbary | ............... | E04B 2/90 |
| 2002/0094426 A1 * | 7/2002 | Stepanian | ............... | B01J 13/0091 428/292.1 |
| 2003/0226324 A1 * | 12/2003 | Hogan | ............... | E04B 2/96 52/235 |
| 2004/0045235 A1 * | 3/2004 | Ley | ............... | E04B 2/965 52/235 |
| 2005/0284046 A1 * | 12/2005 | Neal | ............... | E06B 1/36 52/204.5 |
| 2005/0284053 A1 * | 12/2005 | Grunewald | ............... | E04B 2/96 52/235 |
| 2010/0293882 A1 * | 11/2010 | Labrecque | ............... | E04B 2/967 52/705 |
| 2011/0265404 A1 * | 11/2011 | Walker, III | ............... | E04B 2/90 52/235 |
| 2011/0296775 A1 * | 12/2011 | Dolby | ............... | E06B 3/5427 52/204.6 |
| 2011/0298185 A1 * | 12/2011 | Dolby | ............... | E06B 3/5427 277/630 |
| 2014/0026510 A1 * | 1/2014 | Kubassek | ............... | E04B 1/40 52/512 |
| 2014/0208669 A1 | 7/2014 | Weinryb et al. | | |
| 2014/0273701 A1 * | 9/2014 | Samanta | ............... | E04B 1/78 442/334 |
| 2015/0284951 A1 * | 10/2015 | Frederick | ............... | E04B 2/965 52/235 |
| 2015/0345207 A1 * | 12/2015 | Thompson | ............... | E06B 3/025 52/204.6 |
| 2016/0138323 A1 * | 5/2016 | Sonderk R | ............... | E06B 3/5427 52/173.1 |
| 2016/0340064 A1 * | 11/2016 | Loda | ............... | B65B 1/16 |
| 2018/0023295 A1 * | 1/2018 | Ander | ............... | E04B 2/965 |

FOREIGN PATENT DOCUMENTS

| | | | | |
|---|---|---|---|---|
| CN | 103510644 B | | 1/2016 | |
| CN | 107690504 A | * | 2/2018 | ............... E06B 3/66 |
| CN | 207392537 U | * | 5/2018 | ............... E04B 2/88 |
| EP | 2703574 | | 3/2014 | |
| KR | 200405532 Y1 | * | 1/2006 | |
| KR | 1020120126323 | | 11/2012 | |
| KR | 1020150111144 A | * | 10/2015 | |
| WO | WO-2018018408 A1 | * | 2/2018 | ............... E04B 2/88 |

* cited by examiner

STRUCTURE FOR BLOCKING HEAT TRANSFER THROUGH THERMAL BRIDGE OF CURTAIN WALL BUILDING

CROSS REFERENCE OF RELATED APPLICATION

This is a U.S. National Stage under 35 U.S.C 371 of the International Application PCT/CN2015/095388, filed Nov. 24, 2015.

BACKGROUND OF THE PRESENT INVENTION

Field of Invention

The present invention relates to a structure for blocking heat transfer in a building, and specifically to a structure for blocking heat transfer in a curtain wall building.

Description of Related Arts

In the curtain wall building, a thermal bridge, which is very difficult to be treated, is formed between an indoor metal frame and an outdoor metal frame or between an indoor metal frame and metal components, which causes great energy loss. In order to solve the above problem, the thermal break material must be installed between the indoor metal frame and the outdoor metal frame or between the indoor metal frame and the metal components. The space formed between the indoor metal frame and the outdoor metal frame or between the indoor metal frame and the metal components is usually very small and the thermal conductivities of existing thermal break materials are all about 0.25 W/(m·K), so the existing thermal break materials are unable to play a substantial effect in the given limited space, even if the materials have already been installed, the heat insulation performance of the curtain wall is unable to meet design requirements, and may cause the condensation problem in the interior of the curtain wall. On the contrary, in order to ensure the heat insulation performance, the existing curtain wall structure must be changed to reserve more space for the existing thermal break materials; which will reduce the adaptability of the existing curtain wall profiles, and increase the usage of the profiles and the cost of cutting new dies. In addition, the shape of the space formed between the indoor metal frame and the outdoor metal frame or between the indoor metal frame and the metal components is various and irregular, and the existing thermal break materials are mostly fixed shape products and are difficult to adapt various space structures, the frame of the curtain wall has to be designed in coordination with the shapes of the existing thermal break material products. Meanwhile, to meet the required heat insulation performance, there is a need to use several different types of the thermal break products so as to make up each other's shortage, thereby resulting in complex construction technology and poor structural strength. Furthermore, the combustion performance of the material used in the existing thermal break design is all fire rated B-class or below, so that it may be unsuitable for the curtain wall project with high fireproof and fire-resistant performance requirement. Also, the structure of the thermal break is usually that the thermal break material is held between the outdoor metal and the indoor metal, and the existing thermal break materials are usually regarded as the weak point and the security risk in the loading path of the structure.

SUMMARY OF THE PRESENT INVENTION

The present invention aims to overcome the above problems and provide a structure for blocking heat transfer through a thermal bridge of a curtain wall building which has simple structure, convenient construction technology, great structural strength, excellent fireproof performance, low comprehensive construction cost and substantially improved energy-saving effect of the curtain wall.

To achieve the above aim, the technical solutions of the present invention are as follows.

A structure for blocking heat transfer through a thermal bridge of a curtain wall building comprises a curtain wall, an indoor metal frame and/or an outdoor metal frame and/or metal components, and an integral aerogel thermal break strip, which is installed close to an outside and made of an aerogel thermal insulation blanket, is fixed between the indoor metal frame and/or the curtain wall and/or the outdoor metal frame and/or the metal components.

In the structure for blocking heat transfer through the thermal bridge of the curtain wall building according to the present invention, the curtain wall is visual glass curtain wall and the visual glass curtain wall is fixed to the indoor metal frame by metal pressing blocks and gaskets. A binding site where the indoor metal frame and the metal component cooperates with each other forms a channel, the aerogel thermal break strip between the indoor metal frame and the metal component is fixed to the indoor metal frame by fasteners, and the visual glass curtain wall and the metal component are sealed with each other by silicone sealant.

In the structure for blocking heat transfer through the thermal bridge of the curtain wall building according to the present invention, the curtain wall is a metal cladding panel, thermal insulation is located in an inner side of the metal cladding panel, a binding site where the metal cladding panel and the indoor metal frame cooperates with each other forms an L-shape, the aerogel thermal break strip fixed at the binding site of the metal cladding panel and the indoor metal frame by fasteners is also L-shaped, and adjacent metal cladding panels are sealed with each other by silicone sealant.

In the structure for blocking heat transfer through the thermal bridge of the curtain wall building according to the present invention, the curtain wall is a visual glass curtain wall and the visual glass curtain wall is fixed to the indoor metal frame by structural silicone sealant and double-sided tapes. The metal component is U-shaped, the outdoor metal frame is connected to the indoor metal frame by nylon thermal break strips and the U-shaped metal component is fixed to the indoor metal frame by metal fasteners. Gaskets are installed between the outdoor metal frame and the metal component and the aerogel thermal break strip between the indoor metal frame and the metal components is closely fixed to a U-shaped inner side of the metal component.

In the structure for blocking heat transfer through the thermal bridge of the curtain wall building according to the present invention, the metal components comprise a metal sub-frame, a metal edge protector, an outer metal cladding panel and an inner metal cladding panel. An outside of the indoor metal frame is fixed with the metal sub-frame and the metal edge protector by fasteners. The curtain wall comprises a spandrel glass curtain wall in an upper level and a visual glass curtain wall in a lower level. The spandrel glass curtain wall is fixed to the metal sub-frame by structural silicone sealant and the visual glass curtain wall is fixed to the indoor metal frame by structural silicone sealant. The outer metal cladding panel and the inner metal cladding panel are installed from an outside to an inside, and the two metal cladding panels are both installed in an inner side of the spandrel curtain wall. Thermal insulation is located between the two metal cladding panels, the inner metal cladding panel and the outer metal cladding panel are both fixed to the indoor metal frame. The outer metal cladding panel is L-shaped, the aerogel thermal break strip installed between the indoor metal frame and the metal sub-frame, the metal edge protector and the outer metal cladding panel is L-shaped, and the metal edge protector and the spandrel glass curtain wall as well as the metal edge protector and the visual glass curtain wall are both sealed by silicone sealant.

In the structure for blocking heat transfer through the thermal bridge of the curtain wall building according to the present invention, the metal components comprise a metal sub-frame, a metal edge protector, an outer metal cladding panel and an inner metal cladding panel. An outside of the indoor metal frame is fixed with the metal sub-frame and the metal edge protector by fasteners. The curtain wall comprises a spandrel glass curtain wall in an upper level and a visual glass curtain wall in a lower level. The spandrel glass curtain wall is fixed to the metal sub-frame by structural silicone sealant and the visual glass curtain wall is fixed to the indoor metal frame by structural silicone sealant. The two metal cladding panels are provided from an outside to an inside and the two metal cladding panels are both provided in an inner side of the spandrel glass curtain wall. The inner metal cladding panel and the outer metal cladding panel are both fixed to the indoor metal frame. The outer metal cladding panel is L-shaped, the aerogel thermal break strip installed between the indoor metal frame and the metal sub-frame and the outer metal cladding panel is flat and straight, and the metal edge protector and the spandrel glass curtain wall as well as the metal edge protector and the visual glass curtain wall are both sealed by silicone sealant.

In the structure for blocking heat transfer through the thermal bridge the curtain wall building according to the present invention, the curtain wall is stone or a metal cladding panel, the metal components are metal flashings, and an aerogel thermal break strip is installed between the indoor metal frame and the stone or the metal cladding panel and the metal flashings. The aerogel thermal break strip is L-shaped and closely installed to the indoor metal frame, the stone or the metal cladding panel is fixed to the indoor metal frame by metal brackets, two ends of the aerogel thermal break strip are respectively sealed by silicone sealant and two adjacent aerogel thermal break strips are sealed by silicone sealant. Thermal insulation is located in an inner side of the metal flashings.

In the structure for blocking heat transfer through the thermal bridge of the curtain wall building according to the present invention, the curtain wall is a visual glass curtain wall comprising an outer visual glass curtain wall and an inner visual glass curtain wall. The outdoor metal frame is fixed to the indoor metal frame by a first and a second nylon thermal break block. The inner visual glass curtain wall is fixed to the indoor metal frame by structural silicone sealant, and the outer visual glass curtain wall is fixed to the outdoor metal frame and the indoor metal frame by structural silicone sealant. The metal component is an outer decorative cover, and the outer decorative cover is clamped onto the outdoor metal frame, the outer visual glass curtain wall and the inner visual glass curtain wall. The aerogel thermal break strips comprise a first aerogel thermal break strip and a second aerogel thermal break strip, the first aerogel thermal break strip is installed between the outdoor metal frame, the indoor metal frame, the first nylon thermal break block and the second nylon thermal break block, and the second aerogel thermal break strip is installed between the indoor metal frame, the second nylon thermal break block, the outer decorative cover and the inner visual glass curtain wall.

In the structure for blocking heat transfer through the thermal bridge of the curtain wall building according to the present invention, the curtain wall is a glass curtain wall and the metal components comprise an indoor metal cladding panel, an outdoor metal cladding panel and a metal flashing. The glass curtain wall is fixed to the indoor metal frame by structural silicone sealant. The outdoor metal frame is fixed to the indoor metal frame by nylon thermal break strips. The outdoor metal cladding panel is V-shaped, outer ends of the outdoor metal cladding panel are fixed to the outdoor metal frame by fasteners respectively, and inner ends of the outdoor metal cladding panel are fixed to the metal flashing. The metal flashing is mechanically fixed to the indoor metal frame and the indoor metal cladding panel is fixed to the metal flashing by fasteners. The aerogel thermal break strips comprise a first aerogel thermal break strip and a second aerogel thermal break strip. The first aerogel thermal break strip is installed between the outdoor metal cladding panel and the metal flashing and the first aerogel thermal break strip is V-shaped. The second aerogel thermal break strip is installed between the indoor metal frame and the outdoor metal frame and the second aerogel thermal break strip is L-shaped. Nylon thermal break strips are installed between one end of the second aerogel thermal break strip and the glass curtain wall, nylon thermal break strips are installed between another end of the second aerogel thermal break strip and the indoor metal frame and thermal insulation is located between the indoor metal cladding panel and the metal flashing.

A structure for blocking heat transfer through a thermal bridge of a skylight comprises metal window frames fixed to a steel beam and operable metal window sashes with skylight glass fixed thereto. A metal condensation water collection channel is installed between the metal window frames and the steel beam, a PVC thermal break mat is installed between two adjacent metal window frames and the metal condensation water collection channel, a concave metal drainage gutter is installed between the metal window frames, an integral and concave aerogel thermal break strip which is installed close to an outside and made of an aerogel thermal insulation blanket is fixed between the metal window frames and the concave metal drainage gutter and the PVC thermal break mat, and two ends of the aerogel thermal break strip and the metal window frames are sealed by silicone sealant.

A structure for blocking heat transfer through a thermal bridge of a window frame comprises a steel frame, an aluminum alloy window frame and a window glass mounted in the aluminum alloy window frame, as well as an indoor and an outdoor metal decorative cover. An integral aerogel thermal break strip made of an aerogel thermal insulation blanket is fixed between the steel frame, the indoor and the outdoor metal decorative cover and the aluminum alloy window frame.

A structure for blocking heat transfer through a thermal bridge of a cantilevered beam of a canopy comprises a cantilevered beam of a canopy and an exterior metal cladding panel fixed around the beam of the canopy by metal brackets. An integral aerogel thermal break strip which is wrapped over an external surface of the beam of the canopy and made of an aerogel thermal insulation blanket is installed between the beam of the canopy and the exterior metal cladding panel.

A structure for blocking heat transfer through a thermal bridge of a roof comprises a metal roof beam with a rectangular vertical section, metal flashings and an indoor roof metal cladding panel. Thermal insulation is filled between the metal roof beam, the metal flashings and the indoor roof metal cladding panel. Two adjacent indoor roof metal cladding panels are connected by metal clampers and fixed to the metal roof beam by fasteners. An integral aerogel thermal break strip made of an aerogel thermal insulation blanket is fixed between the metal roof beam and the metal clampers, and two adjacent indoor roof metal cladding panels are sealed with each other by silicone sealant.

After adopting the above solutions, comparing to the prior art, since the integral aerogel thermal break strip which is installed close to the outside and made of the aerogel thermal insulation blanket is fixed between the indoor metal frame and the curtain wall or the outdoor metal frame or the metal components, and a thermal conductivity of the aerogel thermal break strip made of the aerogel thermal insulation blanket is not higher than 0.021 W/(m·K), a thermal performance of the curtain wall is greatly enhanced, for ensuring that there is no condensation problem in an interior of the curtain wall, and a comprehensive construction cost of the curtain wall is decreased without changing frame profiles of the existing curtain wall design. A structure of the thermal break bridge is simplified, therefore the structure of the curtain wall is simplified and the construction is convenient to be well adapted to various cross-sectional shapes with an advantage that the aerogel thermal insulation blanket is easy to be assembled, thereby forming an identical material, continuous and integral thermal break design, substantially improving energy-saving effect of the curtain wall. Furthermore, since the aerogel thermal insulation blanket is made of thermal break material with fire rated A-class combustion performance, the fireproof and fire-resistant performance of the curtain wall is able to be better ensured.

The structure for blocking heat transfer through the thermal bridge of the curtain wall building according to the present invention will be described in detail below in conjunction with the drawings.

DETAILED DESCRIPTION OF THE PREFERRED EMBODIMENT

A structure for blocking heat transfer through a thermal bridge of a curtain wall building according to the present invention comprises a curtain wall, an indoor metal frame, an outdoor metal frame and/or a metal component. An integral aerogel thermal break strip, which is installed close to an outside and made of an aerogel thermal insulation blanket, is fixed between the indoor metal frame and the curtain wall and/or the outdoor metal frame and/or the metal component, the commercially available aerogel thermal insulation blanket (Aerogel) is manufactured by Warmframe Corporation of China, Cabot Corporation and ASPEN Corporation of United States, with the thermal conductivity up to 0.015-0.021 W/(m·k).

Figure 1:
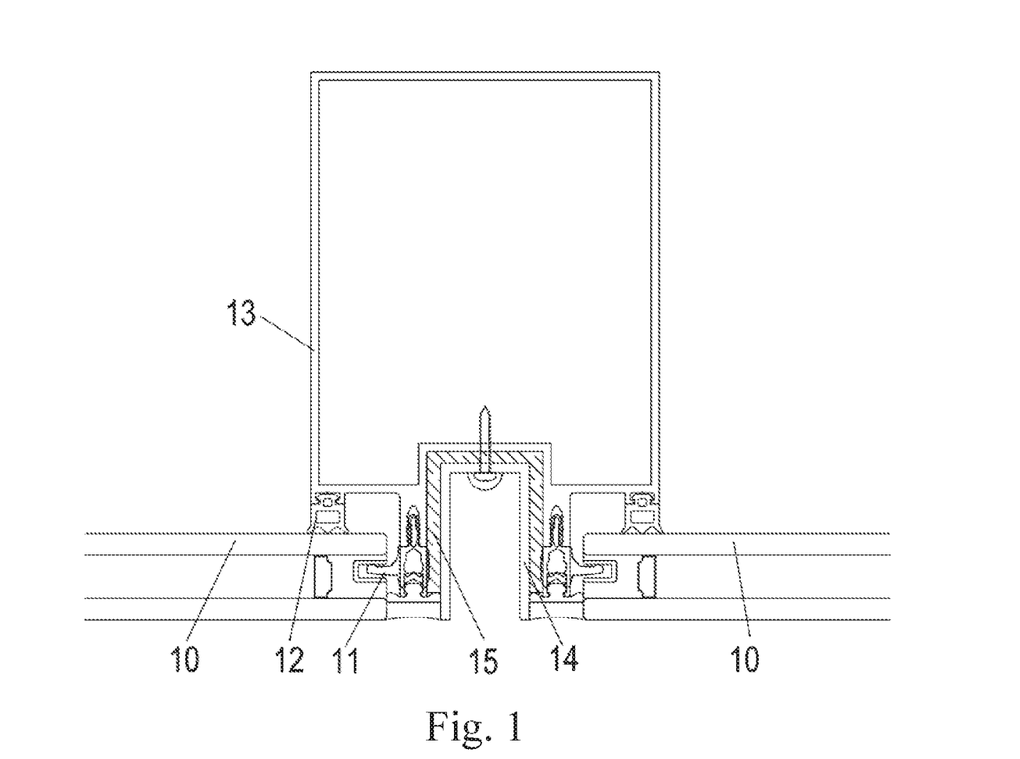
FIG. 1 is a cross section view of a structure for blocking heat transfer through a thermal bridge of a curtain wall building according to a first preferred embodiment of the present invention.

As shown in FIG. 1, a structure for blocking heat transfer through a thermal bridge of a building according to a first preferred embodiment of the present invention is illustrated, which comprises a curtain wall, an indoor metal frame 13 and a metal component 14 located at an outer side of the indoor metal frame 13. The indoor metal frame 13 is an aluminum alloy frame, and the metal component 14 is an aluminum alloy component. The curtain wall is a visual glass curtain wall 10 and the visual glass curtain wall 10 is fixed to the indoor metal frame 13 by metal pressing blocks 11 and gaskets 12. A binding site where the indoor metal frame 13 cooperates with the metal component 14 forms a U-shaped structure. A U-shaped aerogel thermal break strip 15 is installed between the indoor metal frame 13 and the metal component 14, that is, the aerogel thermal break strip 15 is located within the U-shaped structure and is fixed to the indoor metal frame 13 and the metal component 14 by screw fasteners, and the visual glass curtain wall 10 and the metal component 14 are sealed with each other by silicone sealant.

Because the aerogel thermal break strip 15, which is an aerogel thermal insulation blanket with a thermal conductivity no greater than 0.021 W/(m·K) is installed in a U-shaped and limited space between the indoor metal frame 13 and the metal component 14, a thermal performance of the curtain wall is substantially enhanced for ensuring that there is no condensation problem in an interior of the curtain wall, and a comprehensive construction cost of the curtain wall is decreased without changing frame profiles of the existing curtain wall. A structure of the thermal break bridge is simplified to be well adapted to a U-shaped cross-sectional shape of the U-shaped structure with an advantage that the aerogel thermal insulation blanket is easy to be assembled, thereby forming an identical material, continuous and integral thermal break bridge design. Since the aerogel thermal insulation blanket is made of a thermal break material with fire rated A-class combustion performance, a fireproof and fire-resistant performance of the curtain wall is able to be better ensured. The aerogel thermal break strip is mechanically fixed to the indoor metal frame and the metal component by fasteners, thereby making a connection stronger and eliminating a potential structural safety risk.

Figure 2:
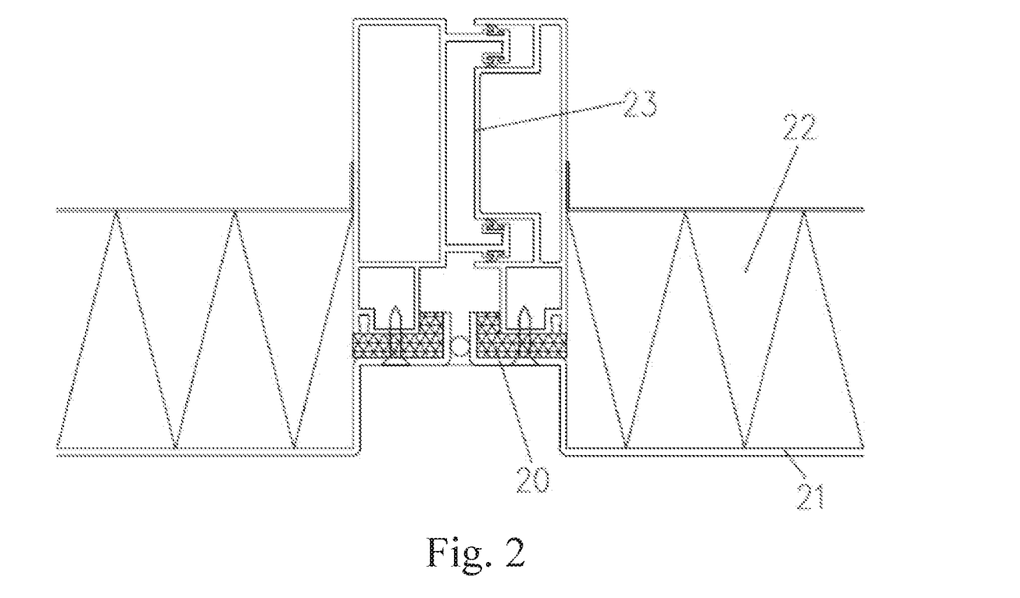
FIG. 2 is a cross section view of a structure for blocking heat transfer through a thermal bridge of a curtain wall building according to a second preferred embodiment of the present invention.

As shown in FIG. 2, a structure for blocking heat transfer through a thermal bridge of a curtain wall building according to a second preferred embodiment of the present invention is illustrated, which comprises a curtain wall 21 and an indoor metal frame 23, wherein the curtain wall 21 is a metal cladding panel, thermal insulation 22 is located in an inner side of the metal cladding panel 21, and the indoor metal frame 23 is an aluminum alloy frame. A binding site where the metal cladding panel 21 cooperates with the indoor metal frame 23 forms an L-shape, aerogel thermal break strips 20 fixed at the binding site of the metal cladding panel 21 and the indoor metal frame 23 by screw fasteners are also L-shaped, the aerogel thermal break strips 20 are two, and two adjacent metal cladding panels 21 are sealed with each other by silicone sealant.

Figure 3:
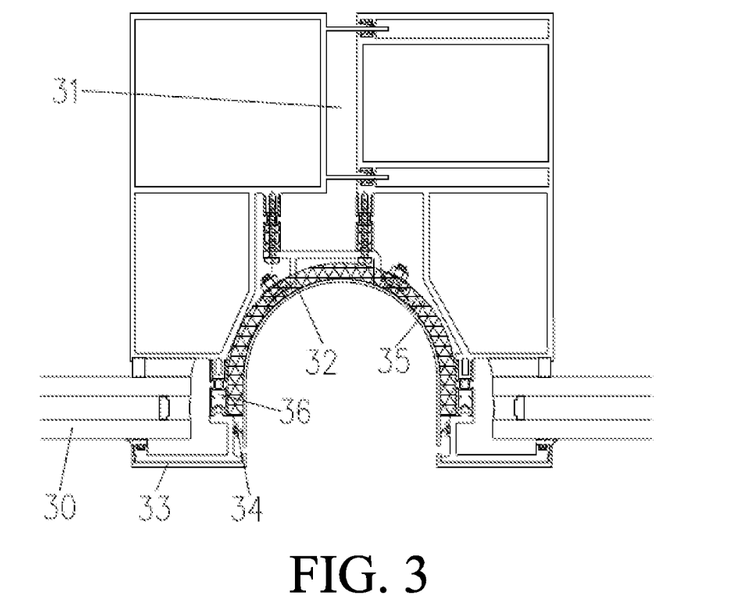
FIG. 3 is a longitudinal section view of a structure for blocking heat transfer through a thermal bridge of a curtain wall building according to a third preferred embodiment of the present invention.

As shown in FIG. 3, a structure for blocking heat transfer through a thermal bridge of a curtain wall building according to a third preferred embodiment of the present invention is illustrated, which comprises a curtain wall, an indoor metal frame 31, an outdoor metal frame 33 and a metal component 32. The curtain wall is a visual glass curtain wall 30, and the indoor metal frame 31 and the outdoor metal frame 33 are both aluminum alloy frames. The visual glass curtain wall 30 is fixed to the indoor metal frame 31 by structural silicone sealant and double-sided tapes. The metal component 32 is a U-shaped aluminum alloy component, the outdoor metal frame 33 is connected to the indoor metal frame 31 by nylon thermal break strips 36 and the U-shaped aluminum alloy component is fixed to the indoor metal frame 31 by metal fasteners. Gaskets 34 are located between the outdoor metal frame 33 and the metal component 32, and an aerogel thermal break strip 35 between the indoor metal frame 31 and the metal component 32 is closely fixed to a U-shaped inner side of the metal component 32.

Figure 4:
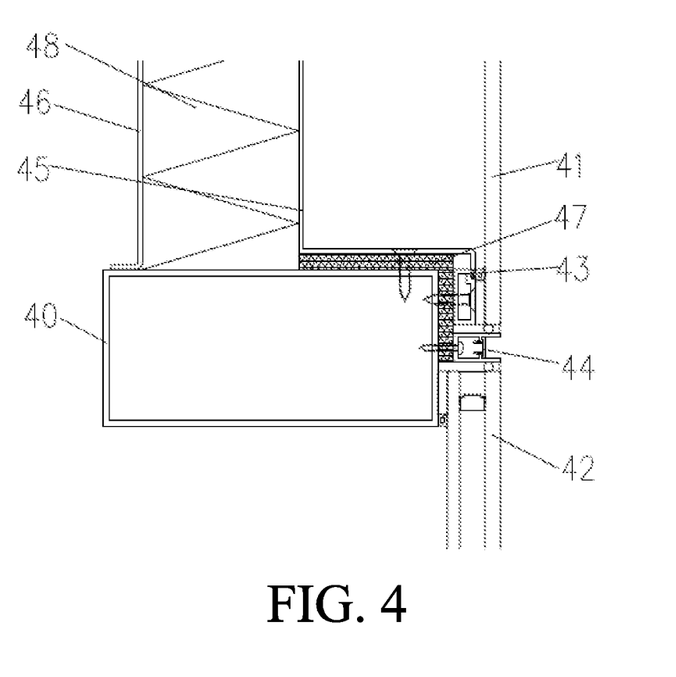
FIG. 4 is a longitudinal section view of a structure for blocking heat transfer through a thermal bridge of a curtain wall building according to a fourth preferred embodiment of the present invention.

As shown in FIG. 4, a structure for blocking heat transfer through a thermal bridge of a curtain wall building according to a fourth preferred embodiment of the present invention is illustrated, which comprises a curtain wall, an indoor metal frame 40 and metal components which comprise a metal sub-frame 43, a metal edge protector 44, an outer metal cladding panel 45 and an inner metal cladding panel 46. The indoor metal frame 40 is an aluminum alloy frame and the metal sub-frame 43 and the metal edge protector 44 are fixed to an outside of the indoor metal frame 40 by screw fasteners. The metal sub-frame 43 is an aluminum alloy sub-frame and the metal edge protector 44 is an aluminum alloy edge protector. The curtain wall comprises a spandrel glass curtain wall 41 in an upper level and a visual glass curtain wall 42 in a lower level. The spandrel glass curtain wall 41 is fixed to the metal sub-frame 43 by structural silicone sealant and the visual glass curtain wall 42 is fixed to the indoor metal frame 40 by structural silicone sealant. The outer metal cladding panel 45 and the inner metal cladding panel 46 are both installed at an inner side of the spandrel glass curtain wall 41 and the outer metal cladding panel 45 and the inner metal cladding panel 46 are installed from an outside to an inside. The inner metal cladding panel 46 is fixed to the indoor metal frame 40 and the outer metal cladding panel 45 is fixed to the indoor metal frame 40 by screw fasteners. The outer metal cladding panel 45 is L-shaped and an aerogel thermal break strip 47 is also L-shaped. The aerogel thermal break strip 47 is installed between the indoor metal frame 40 and the metal sub-frame 43, the metal edge protector 44 and the outer metal cladding panel 45. The metal edge protector 44 and the spandrel glass curtain wall 41 as well as the metal edge protector 44 and the visual glass curtain wall 42 are both sealed with each other by silicone sealant. Thermal insulation 48 is located between the outer metal cladding panel 45 and the inner metal cladding panel 46.

Figure 5:
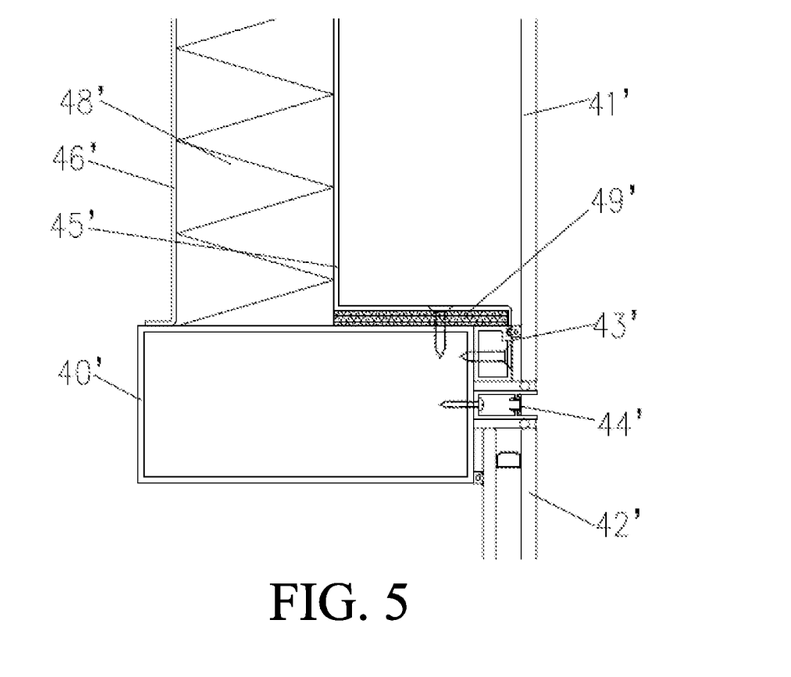
FIG. 5 is a longitudinal section view of a structure for blocking heat transfer through a thermal bridge of a curtain wall building according to a fifth preferred embodiment of the present invention.

As shown in FIG. 5, a structure for blocking heat transfer through a thermal bridge of a curtain wall building according to a fifth preferred embodiment of the present invention is illustrated, which comprises a curtain wall, an indoor metal frame 40' and metal components which comprise a metal sub-frame 43', a metal edge protector 44', an outer metal cladding panel 45' and an inner metal cladding panel 46'. The indoor metal frame 40' is an aluminum alloy frame and the metal sub-frame 43' and the metal edge protector 44' are fixed to an outside of the indoor metal frame 40' by screw fasteners. The metal sub-frame 43' is an aluminum alloy sub-frame and the metal edge protector 44' is an aluminum alloy edge protector. The curtain wall comprises a spandrel glass curtain wall 41' in an upper level and a visual glass curtain wall 42' in a lower level. The spandrel glass curtain wall 41' is fixed to the metal sub-frame 43' by structural silicone sealant and the visual glass curtain wall 42' is fixed to the indoor metal frame 40' by structural silicone sealant. The outer metal cladding panel 45' and the inner metal cladding panel 46' are installed at an inner side of the spandrel glass curtain wall 41' and the outer metal cladding panel 45' and the inner metal cladding panel 46' are installed from an outside to an inside. The inner metal cladding panel 46' is fixed to the indoor metal frame 40' and the outer metal cladding panel 45' is fixed to the indoor metal frame 40' by screw fasteners. The outer metal cladding panel 45' is L-shaped and an aerogel thermal break strip 49' is flat and straight. The aerogel thermal break strip 49' is installed between the indoor metal frame 40' and the metal sub-frame 43', the metal edge protector 44' and the outer metal cladding panel 45'. The metal edge protector 44' and the spandrel glass curtain wall 41' as well as the metal edge protector 44' and the visual glass curtain wall 42' are both sealed with each other by silicone sealant. Thermal insulation 48' is located between the outer metal cladding panel 45' and the inner metal cladding panel 46'.

Figure 6:
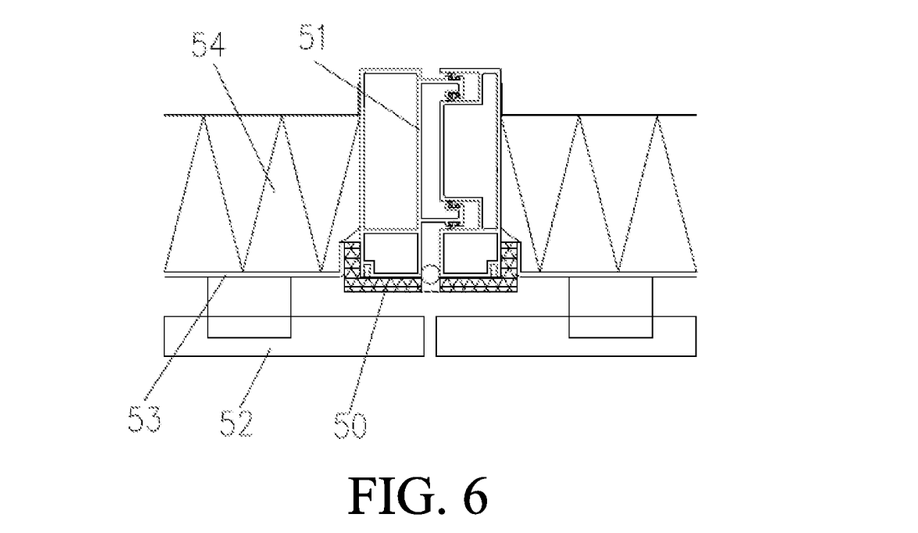
FIG. 6 is a cross section view of a structure for blocking heat transfer through a thermal bridge of a curtain wall building according to a sixth preferred embodiment of the present invention.

As shown in FIG. 6, a structure for blocking heat transfer through a thermal bridge of a curtain wall building according to a sixth preferred embodiment of the present invention is illustrated, which comprises a curtain wall, an indoor metal frame 51 and metal components. The curtain wall is stone or metal cladding panel 52, and the metal components are metal flashings 53, and the indoor metal frame 51 is an aluminum alloy frame. The stone or the metal cladding panel 52 is fixed to an outside of the indoor metal frame 51 by metal brackets, aerogel thermal break strips 50 are installed between the indoor metal frame 51 and the stone or the metal cladding panel 52 and the metal flashings 53. The aerogel thermal break strips 50 are L-shaped and closely installed to the indoor metal frame 51. Two ends of the aerogel thermal break strips 50 are respectively sealed by silicone sealant and two adjacent aerogel thermal break strips 50 are sealed with each other by silicone sealant. Thermal insulation 54 is located in an inner side of the metal flashings 53.

Figure 7:
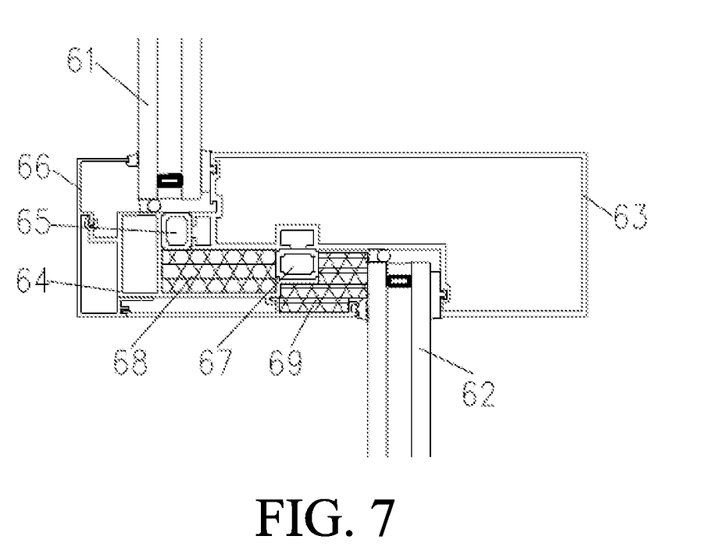
FIG. 7 is a cross section view of a structure for blocking heat transfer through a thermal bridge of a curtain wall building according to a seventh embodiment of the present invention.

As shown in FIG. 7, a structure for blocking heat transfer through a thermal bridge of a curtain wall building according to a seventh preferred embodiment of the present invention is illustrated, which comprises a curtain wall, an indoor metal frame 63, an outdoor metal frame 64 and a metal component. The indoor metal frame 63 and the outdoor metal frame 64 are both aluminum alloy frames. The curtain wall is a visual glass curtain wall comprising an outer visual glass curtain wall 61 and an inner visual glass curtain wall 62. The outdoor metal frame 64 is connected to the indoor metal frame 63 by a first and a second nylon thermal insulation block 65, 67. The inner visual glass curtain wall 62 is fixed to the indoor metal frame 63 by structural silicone sealant and the outer visual glass curtain wall 61 is fixed to the outdoor metal frame 64 and the indoor metal frame 63 by structural silicone sealant. The metal component is an outer aluminum alloy decorative cover 66 and the outer aluminum alloy decorative cover 66 is clamped on the outdoor metal frame 64, the outer visual glass curtain wall 61 and the inner visual glass curtain wall 62. A first aerogel thermal break strip 68 is installed between the outdoor metal frame 64, the indoor metal frame 63, the first nylon thermal insulation block 65 and the second nylon thermal insulation block 67, and a second aerogel thermal break strip 69 is installed between the indoor metal frame 63, the second nylon thermal insulation block 67, the outer aluminum alloy decorative cover 66 and the inner visual glass curtain wall 62.

Figure 8:
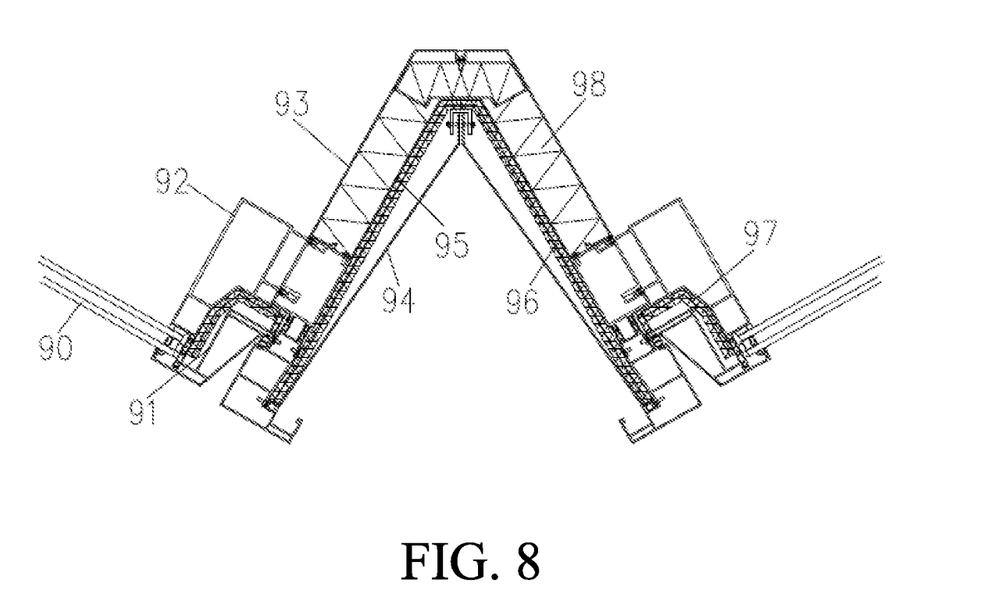
FIG. 8 is a longitudinal section schematic of a structure for blocking heat transfer through a thermal bridge of a curtain wall building according to an eighth preferred embodiment of the present invention.

As shown in FIG. 8, a structure for blocking heat transfer through a thermal bridge of a curtain wall building according to the present invention is illustrated, which comprises a curtain wall, an outdoor aluminum alloy frame 91, an indoor aluminum alloy frame 92 and metal components. The metal components comprise an indoor metal cladding panel 93, an outdoor metal cladding panel 94 and a metal flashing 95. The curtain wall is a visual glass curtain wall 90 and the visual glass curtain wall 90 is fixed to the indoor aluminum alloy frame 92 by structural silicone sealant. The outdoor aluminum alloy frame 91 is fixed to the indoor aluminum alloy frame 92 by nylon thermal break strips, the outdoor metal cladding panel 94 is V-shaped, outer ends of the outdoor metal cladding panel 94 are both fixedly fixed to the outdoor aluminum alloy frame 91 by screw fasteners and inner ends of the outdoor metal cladding panel 94 are fixed to the metal flashing 95. The metal flashing 95 is locked to the indoor aluminum alloy frame 92. The indoor metal cladding panel 93 and the metal flashing 95 are both V-shaped. The indoor metal cladding panel 93 is connected to the metal flashing 95 by screw fasteners. A first integral aerogel thermal break strip 96 made of an aerogel thermal insulation blanket is installed between the outdoor metal cladding panel 94 and the metal flashing 95 and the first aerogel thermal break strip 96 is V-shaped. A second integral aerogel thermal break strip 97 made of an aerogel thermal insulation blanket is installed between the indoor aluminum alloy frame 92 and the outdoor aluminum alloy frame 91, and the second aerogel thermal break strip 97 is L-shaped. Nylon thermal break strips are installed between one end of the second aerogel thermal break strip 97 and the visual glass curtain wall 90, the nylon thermal break strips are installed between another end of the second aerogel thermal break strip 97 and the indoor aluminum alloy frame 92, and thermal insulation 98 is located between the indoor metal cladding panel 93 and the metal flashing 95.

Figure 9:
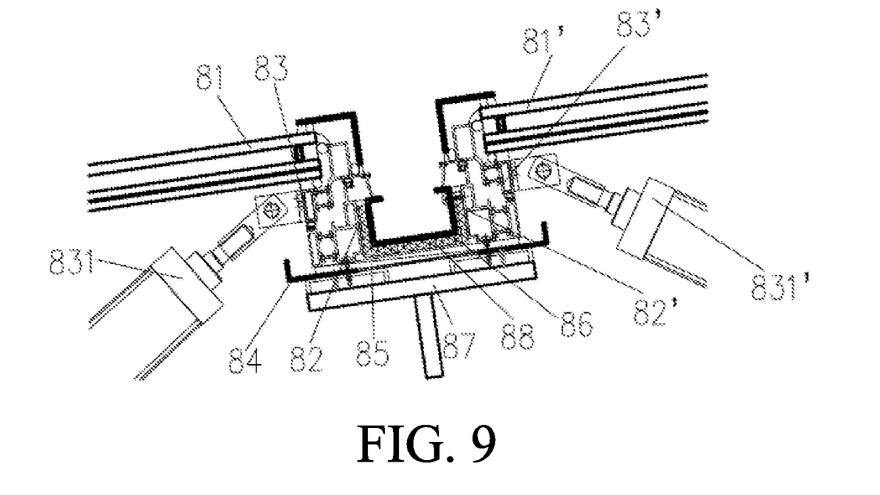
FIG. 9 is a longitudinal section schematic of a structure for blocking heat transfer through a thermal bridge of a curtain wall building skylight according to the present invention.

As shown in FIG. 9, a structure for blocking heat transfer through a thermal bridge of a skylight comprises skylight glasses 81, 81', metal window frames 82, 82', metal window sashes 83, 83', a metal condensation water collection channel 84, a PVC thermal break mat 85, a metal drainage gutter 86 and a steel beam 87. The skylight glasses 81, 81' are fixed to the metal window sashes 83, 83' by silicone sealant, the metal window frames 82, 82' and the metal condensation water collection channel 84 are respectively connected to the steel beam 87 by screw fasteners and the PVC thermal break mat 85 is installed between the metal condensation water collection channel 84 and the metal window frames 82, 82'. The metal drainage gutter 86 is concave. A concave and integral aerogel thermal break strip 88 made of an aerogel thermal insulation blanket is installed between the metal drainage gutter 86 and the two metal window frames 82, 82' and the PVC thermal break mat 85. The metal drainage gutter 86, the aerogel thermal break strip 88 and the metal window frames 82, 82' are connected by screw fasteners. Both ends of the aerogel thermal break strip 88 and the two metal window frames 82, 82' are sealed by silicone sealant. Opening push-rods 831, 831' are respectively hinged at the metal window sashes 83, 83'. Contacting sites of the metal window sashes 83, 83' and the metal window frames 82, 82' are respectively provided with gaskets, and the metal window sashes 83, 83' are able to be opened together with the skylight glasses 81, 81' driven by the opening push-rods 831, 831', respectively.

The aerogel thermal break strip made of the aerogel thermal insulation blanket with a thermal conductivity no greater than 0.021 W/(m·K) is installed in limited spaces between the outdoor metal cladding panel and the metal flashing as well as the outdoor aluminum alloy frame and the indoor aluminum alloy frame, so that a thermal performance of the curtain wall is substantially enhanced for ensuring that there is no condensation problem in an interior of the curtain wall, and a comprehensive construction cost of the curtain wall is decreased without changing frame profiles of the existing curtain wall design. A structure of the thermal break is simplified to be well adapted to L-shaped or V-shaped cross-section with an advantage that the aerogel thermal insulation blanket is easy to be assembled, thereby forming an identical material, continuous and integral thermal break bridge design at the most exterior of the thermal insulation layer of the curtain wall. Moreover, the thermal conductivity of the aerogel thermal insulation blanket is lower than the thermal conductivity of air so that the aerogel thermal break strip made of the aerogel thermal insulation blanket is able to effectively reduce a heat loss generated from air convection. In addition, the aerogel thermal insulation blanket is made of a thermal break material with fire rated A-class combustion performance so that the fireproof and fire-resistant performance of the curtain wall is able to be better ensured.

Figure 10:
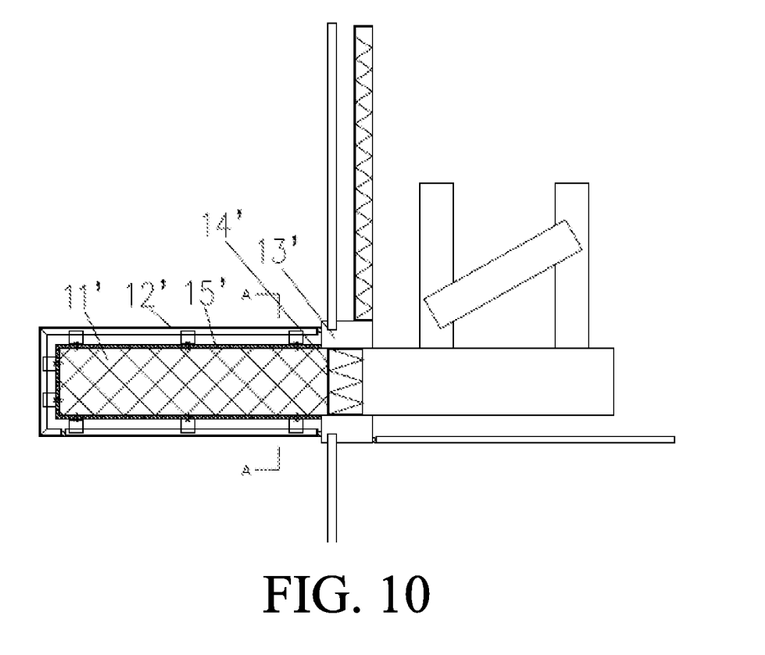
FIG. 10 is a longitudinal section schematic of a structure for blocking heat transfer through a thermal bridge of a cantilevered beam of a curtain wall building canopy according to the present invention.
Figure 11:
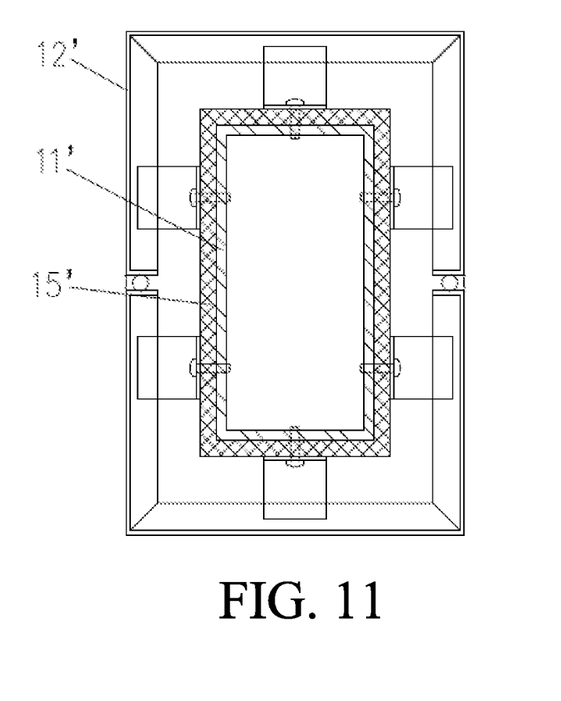
FIG. 11 is a cross section along a direction of A-A in FIG. 10.

As shown in FIGS. 10 and 11, a structure for blocking heat transfer through a thermal bridge of a cantilevered beam of a canopy comprises a cantilevered canopy beam 11' and an exterior metal cladding panel 12', the exterior metal cladding panel 12' is installed around the canopy beam 11' and the exterior metal cladding panel 12' is fixed to the canopy beam 11' by metal brackets. An aerogel thermal break strip 15' is installed between the canopy beam 11' and the exterior metal cladding panel 12' and the aerogel thermal break strip 15' is a continuous strip, made of an aerogel thermal insulation blanket and wrapped over the external surface of the canopy beam 11'. The canopy beam 11' is fixed to a main structure by brackets. Two adjacent exterior metal cladding panels 12' are sealed by silicone sealant, every exterior metal cladding panel 12' and an upright curtain wall frame 13' are sealed by silicone sealant, a metal flashing 14' is installed between two upright curtain wall frames 13' and thermal insulation is located in an inner side of the metal flashing 14.

An aerogel thermal insulation blanket with a thermal conductivity no greater than 0.021 W/(m·K) is wrapped over an external surface of the canopy beam 11' in limited space, with full advantage of a characteristic of low thermal conductivity, a thermal performance of a building is significantly improved and a risk of condensation problem in an interior of the building is reduced. Moreover, since a thickness of the aerogel thermal insulation blanket is only 6 mm or 10 mm, a cladding thickness of the metal cladding panel is maximally reduced, an esthetic effect of the building is guaranteed and a comprehensive construction cost of the curtain wall is simultaneity reduced. Because the aerogel thermal insulation blanket is made of thermal break material with fire rated A-class, the fireproof and fire-resistant performance of the building is able to be better ensured.

Figure 12:
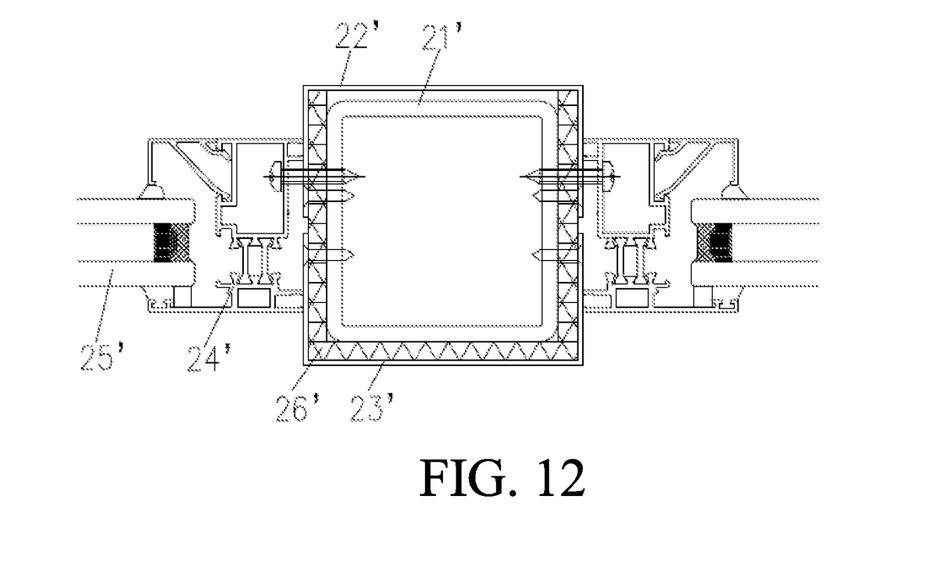
FIG. 12 is a cross section view of a structure for blocking heat transfer through a thermal bridge of a curtain wall building window frame according to the present invention.

As shown in FIG. 12, a structure for blocking heat transfer through a thermal bridge of a window frame comprises a steel frame 21', an aluminum alloy window frame 24' and window glass 25' mounted in the aluminum alloy window frame 24', as well as an indoor and an outdoor metal decorative cover 22', 23'. An integral aerogel thermal break strip 26' made of an aerogel thermal insulation blanket is fixed between the steel frame 21', the indoor and the outdoor metal decorative cover 22', 23' and the aluminum alloy window frame 24'.

The aerogel thermal break strip 26' is made of a concave aerogel thermal insulation blanket with a thermal conductivity no greater than 0.021 W/(m·K) so that a thermal performance of the curtain wall is substantially enhanced for ensuring that there is no condensation problem in an interior of the curtain wall, and a comprehensive construction cost of the curtain wall is decreased without changing frame profiles of the existing curtain wall design. In addition, a structure of the thermal break is simplified to be well adapted to a concave cross-sectional shape with the advantage that the aerogel thermal insulation blanket is easy to be assembled, thereby forming an identical material, continuous and integral thermal break design. Since the aerogel thermal insulation blanket is made of thermal break material with fire rated A-class, the fireproof and fire-resistant performance of the curtain wall is able to be better ensured.

Figure 13:
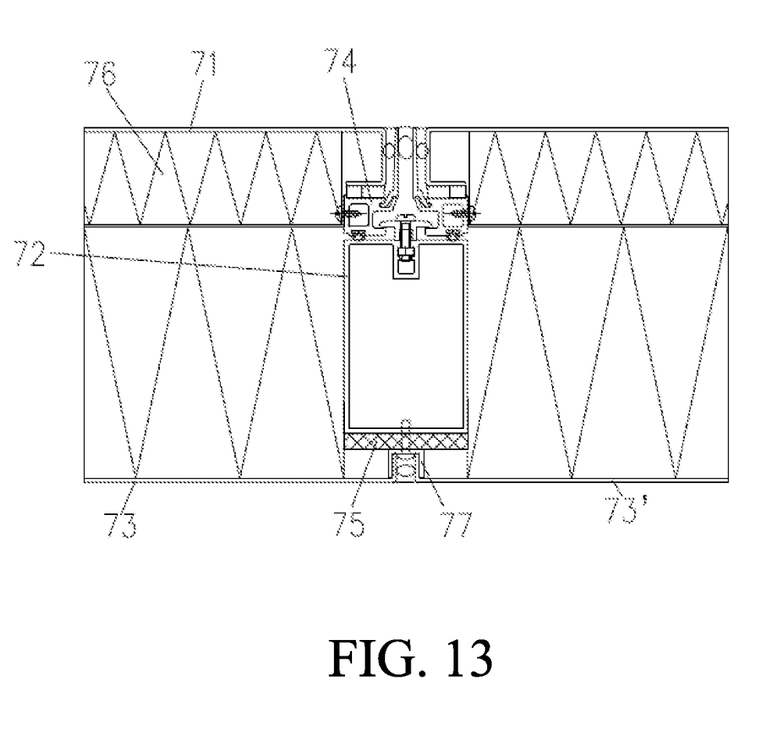
FIG. 13 is a longitudinal section view of a structure for blocking heat transfer through a thermal bridge of a curtain wall building roof according to the present invention.

As shown in FIG. 13, a structure for blocking heat transfer through a thermal bridge of a roof comprises a metal roof beam 72 with a rectangular vertical section, a metal flashing 76 and indoor roof metal cladding panels 73, 73'. Thermal insulation is filled between the metal roof beam 72, the metal flashing 76 and the indoor roof metal cladding panels 73, 73'. Two adjacent indoor roof metal cladding panels 73, 73' are connected together by metal clampers 77 and fixed to the metal roof beam 72 by screw fasteners. An integral aerogel thermal break strip 75 made of an aerogel thermal insulation blanket is fixed between the metal roof beam 72 and the metal clampers 77, and two adjacent indoor roof metal cladding panels 73, 73' are sealed by silicone sealant.

The embodiments set forth above are only described as preferred embodiments and are not intended to limit the scope of the present invention. It will be understood by those skilled in the art that various modifications and improvements to the technical solutions of the present invention may be made without departing the design spirit of the present invention, which all fall into the scope as defined by the claims of the present invention.

PRACTICAL APPLICABILITY

The structure for blocking heat transfer through the thermal bridge of the curtain wall building according to the invention has simple structure, convenient construction technology, great structural strength, excellent fireproof performance, low comprehensive construction cost and substantially improved energy-saving effect of the curtain wall and it is applicable to various curtain wall buildings.

What is claimed is:

1. A structure for blocking heat transfer through a thermal bridge of a building,
   wherein the structure comprises a curtain wall;
   the curtain wall further comprising a U-shaped thermal break strip, an indoor metal frame, and a metal component located at an outer side of the indoor metal frame, wherein:
   the curtain wall is a visual glass curtain wall;
   a binding site where the indoor metal frame cooperates with the metal component forms a U-shaped structure which mates with the U-shaped thermal break strip;
   the U-shaped thermal break strip, which is located within the U-shaped structure, is an aerogel thermal insulation blanket whose thermal conductivity is no greater than 0.021 W/(m·K);
   the U-shaped thermal break strip is fixed to the indoor metal frame and the metal component by screw fasteners.

* * * * *